Oct. 27, 1936.     L. G. HOBBS ET AL     2,059,108
FRANKFURTER ROLL SLITTING MACHINE
Filed Dec. 17, 1934     2 Sheets—Sheet 2
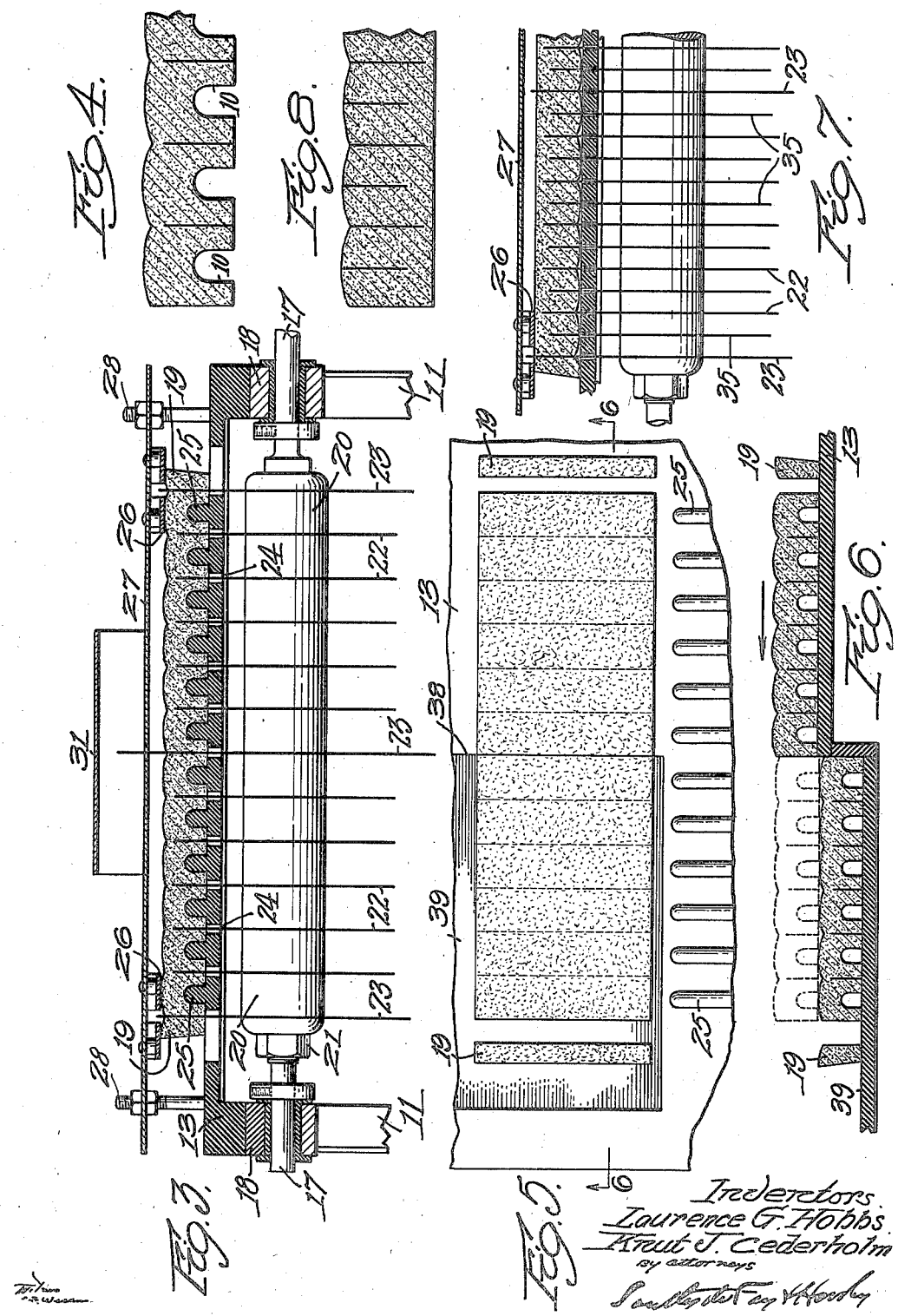

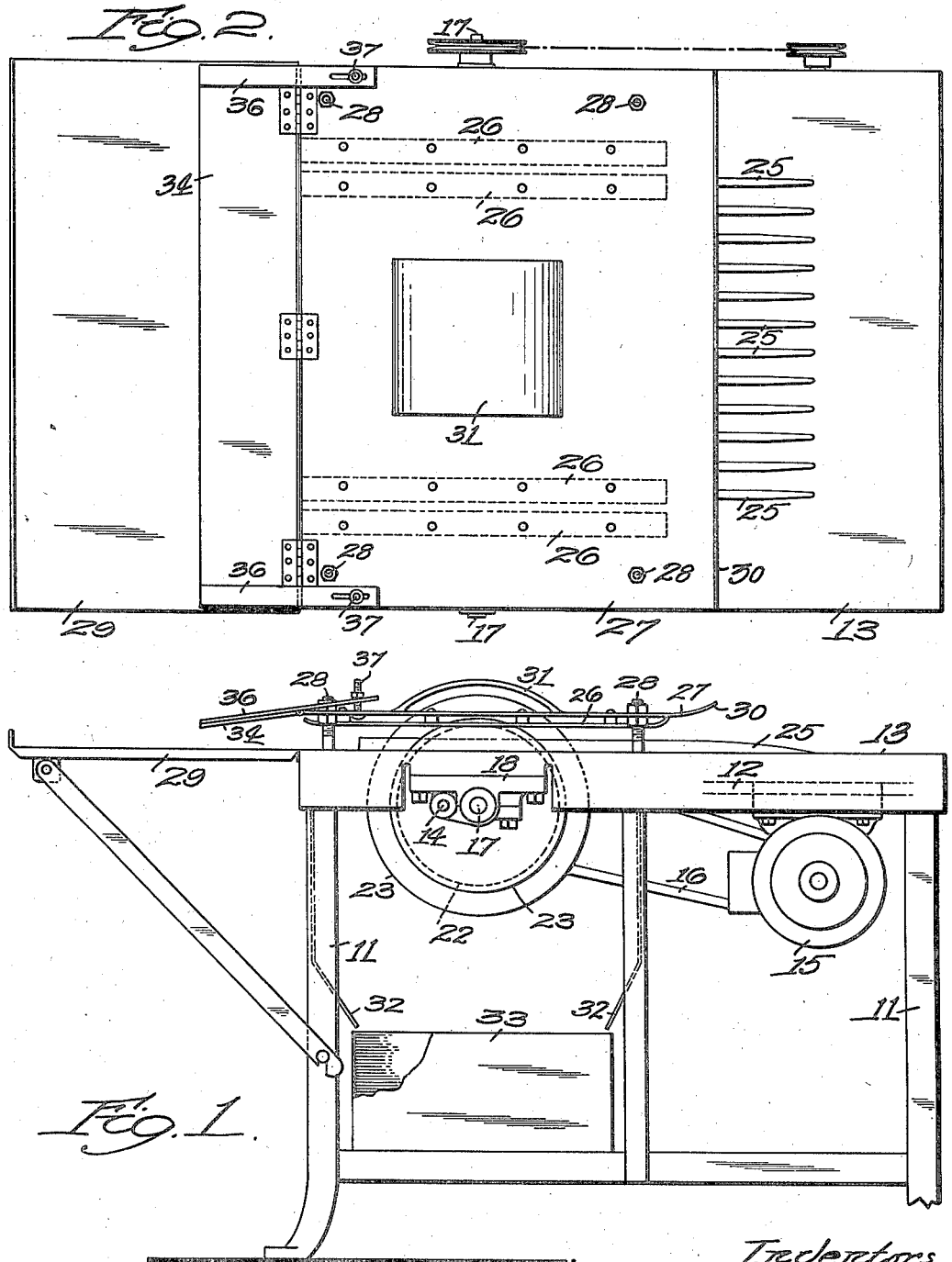

Patented Oct. 27, 1936

2,059,108

UNITED STATES PATENT OFFICE 2,059,108

FRANKFURTER ROLL SLITTING MACHINE

Laurence G. Hobbs and Knut J. Cederholm, Fitchburg, Mass.

Application December 17, 1934, Serial No. 757,844

6 Claims. (Cl. 146—98)

This invention relates to the slitting of ordinary frankfurter rolls or other pastry and also to the slitting of specially formed rolls which are baked with a longitudinal recess in each roll for the reception of the frankfurter or the like.

The principal objects of this invention are to provide a simple and convenient machine for splitting a series of rolls or the like nearly through so that the consumer can separate them from each other; to provide means for splitting the outside crust from a loaf or strip of rolls and to divide such a strip into two parts; to provide simple and effective means for holding a specially formed loaf in proper relation to the cutters during the splitting operation; to provide means for guiding the specially formed rolls through the slitting machine by means of recesses formed in the bottom of the loaf in the act of baking it, and to provide individual knives for splitting each roll of the ordinary type down the back to provide the opening into which the sausage or other filling is to be placed.

Other objects and advantages of the invention will appear hereinafter.

Reference is to be had to the accompanying drawings, in which

Fig. 1 is a side view of a machine constructed in accordance with this invention for use in slitting the specially formed rolls with a recess;

Fig. 2 is a plan thereof;

Fig. 3 is a sectional view of the table for supporting the rolls, the means for holding them down, and the slitting knives;

Fig. 4 is an enlarged sectional view of part of a loaf showing its condition as it leaves the machine ready for the market;

Fig. 5 is a plan of a modified form of discharge table;

Fig. 6 is a sectional view thereof on the line 6—6 of Fig. 5;

Fig. 7 is a view similar to Fig. 3 showing the application of a slightly modified form of the machine to an ordinary roll, and Fig. 8 is a view similar to Fig. 4 showing the ordinary loaf ready for the market.

There is now on the market a frankfurter roll comprising originally a set of twelve, or any other number of rolls, baked in one strip or loaf and provided with recesses 10 in the bottom into which the frankfurter is placed when the sandwich is served. The first three figures show a machine for slitting such a loaf so that it can be separated into individual rolls and so that a baked strip of a dozen rolls can be split in half and the ends trimmed.

The machine is shown in a form in which it comprises stamped steel legs 11 carrying a table 13 on which the loaf previously baked is placed. The loaf is put on this table after it is baked in order to be slit, as shown in Fig. 4.

The table is provided with two T slots 12 in which a motor 15 is adjustably mounted to maintain the belt tension. By a belt 16 the motor drives a shaft 17. This shaft is mounted in bearings 18 carried by a cap secured to the frame. The cap is hinged at 14 in such a manner that by removing one nut at each end, the cap swings on the hinge pin so that the whole assembly can be dropped down and removed from the bottom. The bushings in which the shaft runs are flanged around the sides of the bearing and are removed with the shaft.

On the shaft are mounted a series of blocks 20 secured in position by a nut 21 screwed on by screw-threads carried by the shaft. These blocks carry between them a series of slitters 22 spaced equally apart by the blocks, and held in fixed position when the blocks are tightened up by the nut. There is also a pair of end slitters 23 at the ends of the series for the purpose of cutting off the outer crust 19 at the two ends of the loaf, and a central slitter 23.

The table 13 is provided with slots 24 for receiving the two kinds of slitters. On the table between each two adjacent slitters is integrally mounted a guide 25 normally fitting the recesses 10 above mentioned. In this way a strip of rolls, preferably twelve in length, can be located on the guides and pushed up to a position in which they engage the rotating knives or slitters. They rotate in a direction to assist in moving the strip or loaf of rolls through the machine. The guides are slanted off at the entrance end, as shown in Fig. 1.

Centrally above the end guides 25 are guide stops 26 mounted on a plate 27 to hold the rolls down. This plate is secured to the main frame or table adjustably by studs 28 so that their height may be changed to get them exactly right for the particular rolls being operated upon or for different sized rolls. This plate 27 also furnishes a spring guide 30 which projects upwardly to assist in guiding the rolls into a position for being slit and preventing them from rising at this point before they enter the slitting part of the machine. A curved guard 31 for the center slitter may be applied to the top of the plate 27. Chutes 32 are provided for directing the crumbs into a waste receptacle 33.

In order to retard the speed of the rolls on the discharge side there is a hinged flap 34. This of course is held down by gravity, and the amount of engagement with the discharge rolls is adjusted by means of adjusting studs 37 operating against levers 36. The combined hold-down and guard is attached to the table proper by means of the four studs 28. This arrangement allows a screw adjustment on the height of the hold-down. In this form of the invention the discharge table is made in the form of a hinged leaf 29 which folds down when not in use.

In the form shown in Figs. 5 and 6, the rolls, split into sections of six, are brought out at the end of the machine. Here six of them have no support and they drop through a space at 38 a distance slightly greater then their height on a discharge table 39. Then the other six are slid laterally over the same space 38 and on top of the first six. This greatly facilitates the handling of the product.

In the form of the invention shown in Figs. 7 and 8, the machine is arranged to slit ordinary frankfurter rolls, which are not prepared previously by a recess in the baking. In dispensing this type of roll the usual procedure is to cut the individual roll part way through with a knife and spread the two sides apart. This leaves a longitudinal opening in which the frankfurter or other filling is inserted.

In order to arrange this machine for slitting a loaf made up of say twelve rolls of the ordinary kind, it is prepared as described above except for the recess. It has the excess material at each end. According to Fig. 7 the two ends are trimmed off and the loaf is divided in two by three rotary disc knives 23 just as before. These knives cut all the way through the roll as in the first case. The knives 22 are also used going almost all the way through the loaf so that the loaf can be divided easily into twelve rolls by the consumer. In addition to this a third set of knives 35 are employed intermediate between the knives 22 and they slit the roll down the back to enable the user to spread each roll apart down the middle in order to receive a frankfurter. These knives 35 therefore are of less diameter than the knives 22.

In this case the loaf is drawn through the machine without the employment of the guides 25 as they are not used. The two half loaves each containing six rolls are discharged from the machine in the same way as described above.

In both cases the end slitting knives 23 are employed for the purpose of removing the end crusts so that all the rolls will be alike. In this way a loaf consisting of a dozen rolls may be packed in a single length and slit into two sections of a half dozen each formed as shown in Fig. 4 in one case and in Fig. 8 in the other. They are conveniently delivered, a half dozen on top of another half dozen. The customer merely has to separate or spread the bread on each side of the recess 10 or on each side of the cut produced by the knives 35 for the reception of the frankfurter. The rolls are separated from each other individually in a very simple manner as above referred to.

Having thus described our invention and the advantages thereof, we do not wish to be limited to the details herein disclosed, otherwise than as set forth in the claims, but what we claim is:—

1. In a machine for slitting bakery products having parallel recesses, the combination of a rotary shaft, a series of circular slitting knives carried by the shaft, and a table for supporting the bakery products, said table having a series of parallel guides between the knives entering the recesses in each bakery product to guide it.

2. In a machine for slitting bakery products, having parallel recesses in the bottoms thereof, into individual pieces, the combination of a shaft, a series of parallel slitters on the shaft, a table having perforations therethrough for receiving the slitters, and a series of guides, one between each two slitters, receiving the recesses in the bottom of each bakery product and guiding the same past the slitters.

3. In a machine for slitting bakery products, the combination of a rotary shaft, a series of circular slitting knives carried by the shaft, a table for supporting the bakery products, said table having a series of parallel guides for entering each bakery product to guide it toward the knives, and adjustable plates above said guides engaging and holding the product in contact with the table.

4. In a machine for slitting bakery products having parallel recesses in the bottoms thereof into individual pieces, the combination of a shaft, a series of parallel disc slitters on the shaft, a table having perforations therethrough for receiving the slitters and provided with a series of guides, one between each two slitters entering the recesses in each bakery product and guiding the same past the slitters, and means for rotating the slitters in a direction to draw the product through them and along the guides.

5. In a machine for slitting bakery products, the combination of a rotary shaft, a series of circular slitting knives carried by the shaft, a table for supporting the bakery products, said table having a series of parallel guides entering recesses in a surface of the bakery product to guide it toward the knives, and a plate located above the guides and diverging therefrom to guide the product and hold it down until it encounters the slitter.

6. In a machine for slitting a loaf into a plurality of rolls, the combination with a series of rotary cutters having a larger cutter along them for slitting the loaf into two parts, of a table in position to receive the two parts from the slitting means, said table having a space so located that one of said parts of the loaf will fall through it, and a discharge table below the first named table a distance equal to the height of the loaf for receiving said part of the loaf, whereby the other part of the loaf may be moved along the first named table laterally to rest on the first named part of the loaf.

LAURENCE G. HOBBS.
KNUT J. CEDERHOLM.